(12) United States Patent
Shapiro et al.

(10) Patent No.: US 10,854,899 B2
(45) Date of Patent: Dec. 1, 2020

(54) POWER GENERATION SYSTEM USING CASCADED FUEL CELLS AND ASSOCIATED METHODS THEREOF

(71) Applicant: CUMMINS ENTERPRISE LLC, Indianapolis, IN (US)

(72) Inventors: Andrew Philip Shapiro, Schenectady, NY (US); Irfan Saif Hussaini, Glenville, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 430 days.

(21) Appl. No.: 15/343,318

(22) Filed: Nov. 4, 2016

(65) Prior Publication Data

US 2018/0131020 A1   May 10, 2018

(51) Int. Cl.
*H01M 8/04746* (2016.01)
*H01M 8/04089* (2016.01)
(Continued)

(52) U.S. Cl.
CPC ... *H01M 8/04761* (2013.01); *H01M 8/04097* (2013.01); *H01M 8/04156* (2013.01);
(Continued)

(58) Field of Classification Search
CPC .................................................. H01M 8/04097
See application file for complete search history.

(56) References Cited

U.S. PATENT DOCUMENTS 6,309,770 B1 * 10/2001 Nagayasu ......... H01M 8/04097
429/415
6,344,289 B2   2/2002 Dekker et al.
(Continued)

FOREIGN PATENT DOCUMENTS

DE      10011849 A1   9/2001
EP       1511110 A2   3/2005
EP       1947723 A2   7/2008

OTHER PUBLICATIONS

Buecherl et al. "Fuel economy simulation of a reformer-linked vehicular fuel cell system", 2009 IEEE Vehicle Power and Propulsion Conference, Sep. 7-10, 2009, Dearborn, MI, pp. 711-716.
(Continued)

*Primary Examiner* — Sadie White
(74) *Attorney, Agent, or Firm* — Barnes & Thornburg LLP

(57) ABSTRACT

Power generation systems and associated methods for generating electric power using a cascaded fuel cell are provided. The power generation system may include a first fuel cell, a second fuel cell, a splitting mechanism, a first fuel path, and a second fuel path. The First fuel cell is configured to generate first anode and first cathode tail gas streams. The splitting mechanism is configured to split the first anode tail gas stream into first and second portions. The first fuel path is configured to receive hydrocarbon fuel stream downstream of splitting mechanism, mix with the first portion to form a mixed stream, and circulate the mixed stream to the first fuel cell. The second fuel path is configured to feed the second portion to the second fuel cell. The first and second fuel cells are configured to generate electric power by using the mixed stream and the second portion respectively.

21 Claims, 5 Drawing Sheets

(51) Int. Cl.
*H01M 8/2457* (2016.01)
*H01M 8/04119* (2016.01)
*H01M 8/0612* (2016.01)
*H01M 8/249* (2016.01)

(52) U.S. Cl.
CPC ..... *H01M 8/04164* (2013.01); *H01M 8/0618* (2013.01); *H01M 8/249* (2013.01); *H01M 8/2457* (2016.02); *H01M 2250/20* (2013.01)

(56) References Cited

U.S. PATENT DOCUMENTS

| | | | |
|---|---|---|---|
| 6,623,880 | B1 | 9/2003 | Geisbrecht et al. |
| 7,001,682 | B2 | 2/2006 | Haltiner |
| 7,422,812 | B2 | 9/2008 | Haltiner et al. |
| 7,482,073 | B2 | 1/2009 | Bette et al. |
| 7,615,299 | B2 | 11/2009 | MacBain et al. |
| 7,659,015 | B2 | 2/2010 | Hoffjann et al. |
| 7,858,258 | B2 | 12/2010 | Logan |
| 8,142,943 | B2 | 3/2012 | McElroy et al. |
| 8,394,544 | B2 | 3/2013 | Chick et al. |
| 8,841,042 | B2 | 9/2014 | Erikstrup et al. |
| 9,118,052 | B2 | 8/2015 | Liu et al. |
| 2001/0036566 | A1* | 11/2001 | Dekker ............. H01M 8/04089 429/425 |
| 2004/0180249 | A1 | 9/2004 | Pham et al. |
| 2004/0229102 | A1* | 11/2004 | Jahnke ............. H01M 8/04097 429/410 |
| 2006/0199060 | A1 | 9/2006 | Horiuchi et al. |
| 2007/0281192 | A1 | 12/2007 | Sasaki |
| 2008/0187789 | A1 | 8/2008 | Ghezel-Ayagh |
| 2010/0047641 | A1 | 2/2010 | Jahnke et al. |
| 2011/0223500 | A1* | 9/2011 | Uematsu ........... H01M 8/04014 429/415 |
| 2012/0251899 | A1 | 10/2012 | Lehar et al. |
| 2013/0130134 | A1 | 5/2013 | Chick et al. |
| 2013/0260268 | A1 | 10/2013 | Shapiro et al. |
| 2016/0006065 | A1* | 1/2016 | Hussaini ............. H01M 8/0618 429/410 |

OTHER PUBLICATIONS

Wilson et al., "Cost and unit-sizing analysis of a hybrid SOFC/microturbine generation system for residential applications", North American Power Symposium (NAPS), 2010, Sep. 26-28, 2010, Arlington, TX, 6 Pages.

Budzianowski et al.,"Solid-Oxide Fuel Cells in Power Generation Applications: A Review", Recent Patents on Engineering, Bentham Science, Dec. 2011, vol. 5, No. 3, http://www.eurekaselect.com/94760/article, Abstract 1 page.

Adams et al.,"Energy Conversion with Solid Oxide Fuel Cell Systems: A Review of Concepts and Outlooks for the Short- and Long-T", I&EC, Ind. Eng. Chem, 2013, 52 (9), pp. 3089-3111.

European Search Report and Written Opinion issued in connection with corresponding EP Application No. 15173808.5-1359 dated Nov. 18, 2015, 6 Pages.

* cited by examiner

POWER GENERATION SYSTEM USING CASCADED FUEL CELLS AND ASSOCIATED METHODS THEREOF

BACKGROUND

Embodiments of the present disclosure relate to a power generation system, and more specifically, to a cascaded fuel cells-based power generation system and associated methods thereof.

A fuel cell is an electrochemical energy conversion device that has demonstrated a potential in terms of higher efficiency and lower pollution while employed in power generation systems. In general, a fuel cell generates a direct current (DC) that may be converted to alternating current (AC) via, for example, an inverter. Common types of fuel cells include phosphoric acid fuel cell (PAFC), molten carbonate fuel cell (MCFC), proton exchange membrane fuel cell (PEMFC), and solid oxide fuel cell (SOFC). Fuel cells, such as SOFCs, may operate in large-scale power generation system to satisfy industrial and municipal needs. Others types of fuel cells may be useful for smaller portable applications such as, for example, powering automobiles. In practice, fuel cells may be arranged in the electrical system either in series or in parallel to generate electricity at required voltages or currents.

In general, a fuel cell includes two electrodes and an electrolyte disposed between them. During operation, electrochemical reactions occur in the fuel cell to convert hydrogen (fuel) and oxygen (oxidant) into water or steam (byproduct) and generate electricity. Typically, the electrochemical reactions occur at the electrodes where a catalyst is often disposed to speed up such reactions. The electrodes provide an increased surface area for the electrochemical reactions to occur. The electrolyte transfers electrically charged particles from one electrode to the other electrode and is otherwise substantially impermeable to both the fuel and the oxidant. The byproducts may exit the fuel cell at high operating temperature. The byproduct may include various other components in addition to steam or water, such as hydrogen, carbon monoxide, methane, and carbon dioxide.

Generally, the power generation system further includes a reformer for reforming a hydrocarbon fuels by using the byproduct(s) of the fuel cell to produce a reformed stream that contains substantial amounts of hydrogen. The reformed stream may then be circulated to the fuel cell to further improve the efficiency of the fuel cell. However, the mass of the reformed stream in such systems often becomes substantially high and thus difficult to handle. Further, steam-to-carbon ratio of the reformed stream may end up beyond the desired values thus lowering the quality (e.g., heating value) of the reformed stream as a fuel and thereby reducing the overall efficiency of the fuel cell. Further, the power generation system may require a high temperature heat exchange material to handle the hot byproducts from the fuel cell, which may further increase the overall cost of the system. Thus, there is a need for more efficient power generation systems that incorporate more efficient fuel cells.

BRIEF DESCRIPTION

In accordance with one example embodiment, a power generation system having cascaded fuel cells is disclosed. The power generation system includes a first fuel cell, a second fuel cell, a splitting mechanism, a first fuel path, and a second fuel path. Each fuel cell includes an anode inlet, an anode outlet, a cathode inlet and a cathode outlet. The first fuel cell is configured to generate a first anode tail gas stream and a first cathode tail gas stream. The second fuel cell is configured to generate a second anode tail gas stream and a second cathode tail gas stream. The splitting mechanism is configured to split the first anode tail gas stream into a first portion and a second portion. The first fuel path is configured to receive a hydrocarbon fuel downstream of the splitting mechanism via a hydrocarbon fuel inlet channel and mix the hydrocarbon fuel with the first portion of the first anode tail gas stream to form a first mixed stream. The first fuel path is further configured to circulate the first mixed stream to the anode inlet of the first fuel cell, wherein the first fuel cell is further configured to generate a first electric power, at least in part, by using the first mixed stream as a fuel. The second fuel path is configured to feed the second portion of the first anode tail gas stream to the second fuel cell, wherein the second fuel cell is further configured to generate a second electric power, at least in part, by using the second portion of the first anode tail gas stream as a fuel.

In accordance with another example embodiment, a method for generating power using a power generation system having cascaded fuel cells is disclosed. The method involves generating an anode tail gas stream in a first fuel cell and splitting the anode tail gas stream into a first portion and a second portion using a splitting mechanism. The method further involves receiving a hydrocarbon fuel downstream of the splitting mechanism via a hydrocarbon fuel inlet channel and mixing the hydrocarbon fuel with the first portion of the anode tail gas stream to form a first mixed stream. Further, the method involves feeding the first mixed stream to the first fuel cell via a first fuel path and generating a first electric power in the first fuel cell, at least in part, by using the first mixed stream as a fuel. The method further involves feeding the second portion of the anode tail gas stream to a second fuel cell via a second fuel path and generating a second electric power in the second fuel cell, at least in part, by using the second portion of the anode tail gas stream as a fuel.

DRAWINGS

These and other features and aspects of embodiments of the present disclosure will become better understood when the following detailed description is read with reference to the accompanying drawings in which like characters represent like parts within the individual drawings, wherein.

DETAILED DESCRIPTION

Figure 1:
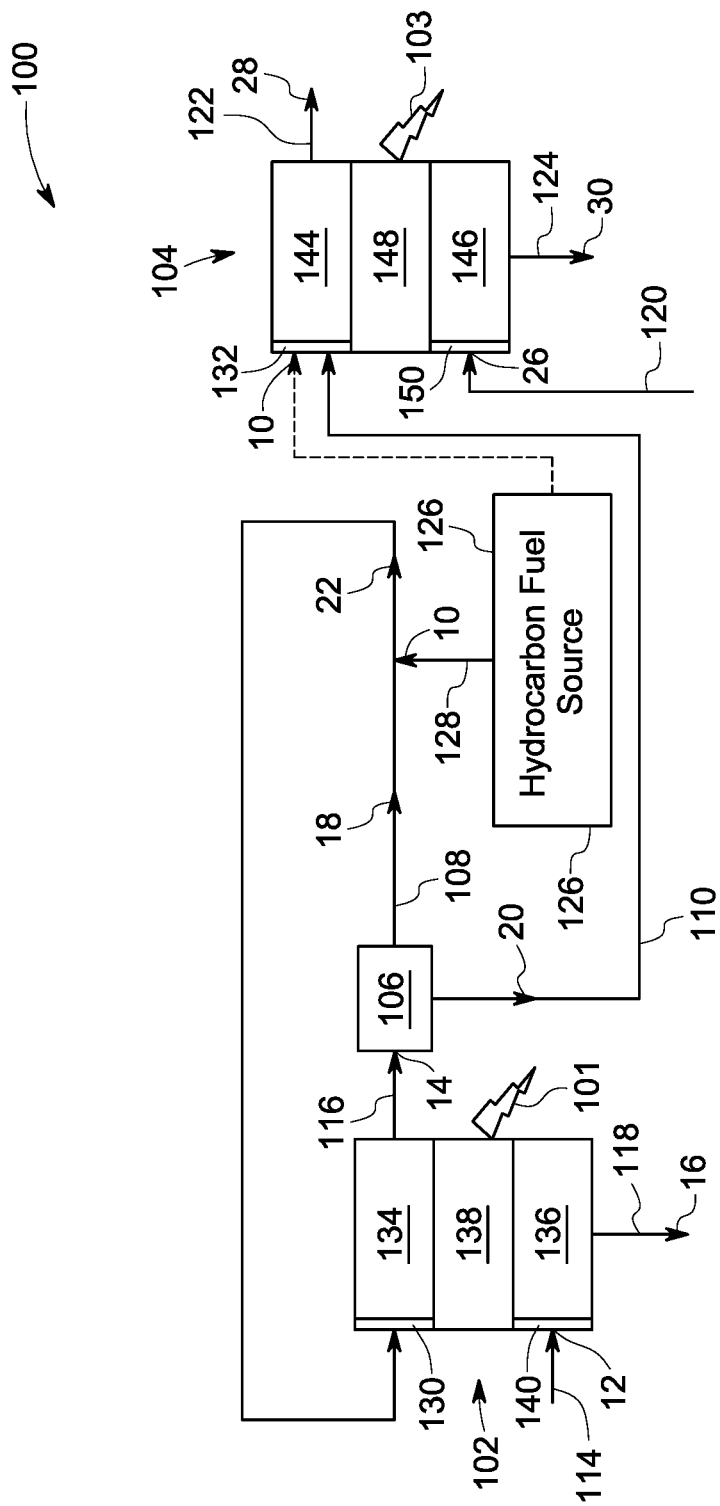
FIG. 1 is a schematic illustration of a power generation system in accordance with one example embodiment of the present disclosure.

To more clearly and concisely describe and point out the subject matter, the following definitions are provided for specific terms, which are used throughout the following description and the appended claims, unless specifically denoted otherwise with respect to particular embodiments. The term "first mixed stream" as used in the context refers to a mixture of an anode tail gas stream and a hydrocarbon fuel stream. The term "reformed stream" as used herein refers to a fuel including products that are derived from reforming of a hydrocarbon fuel stream using the steam in a reformer. The products in the reformed stream generally include, but not limited to, a mixture of hydrogen ($H_2$) and carbon monoxide (CO).

Embodiments of the present disclosure discussed herein relate to power generation system including cascaded fuel cells. Specifically, the power generation system includes a first fuel cell, a second fuel cell, a splitting mechanism, a first fuel path, and a second fuel path. Each fuel cell includes an anode inlet, an anode outlet, a cathode inlet and a cathode outlet. The first fuel cell is configured to generate a first anode tail gas stream and a first cathode tail gas stream. The second fuel cell is configured to generate a second anode tail gas stream and a second cathode tail gas stream. The splitting mechanism is configured to split the first anode tail gas stream into a first portion and a second portion. The first fuel path is configured to receive a hydrocarbon fuel stream downstream of the splitting mechanism via a hydrocarbon fuel inlet channel and mix the hydrocarbon fuel stream with the first portion of the first anode tail gas stream to form a first mixed stream. The first fuel path is further configured to circulate the first mixed stream to the anode inlet of the first fuel cell, wherein the first fuel cell is further configured to generate a first electric power, at least in part, by using the first mixed stream as its fuel. The second fuel path is configured to feed the second portion of the first anode tail gas stream to the second fuel cell, wherein the second fuel cell is further configured to generate a second electric power, at least in part, by using the second portion of the first anode tail gas stream as its fuel.

In some embodiments, the power generation system further includes an internal fuel reformer disposed within the first fuel cell and configured to reform the first mixed stream using steam to generate a reformed stream within the fuel cell. The reformed stream may include a mixture of $H_2$ and CO. In some embodiments, the first mixed stream contains steam. In some other embodiments, the steam is supplied to the at least one internal fuel reformer via the anode inlet depending on an operation condition, for example, startup of the power generation system. In some other embodiments, the power generation system further includes at least one external fuel reformer that is disposed downstream of the splitting mechanism and coupled to the first fuel path. In such embodiments, the at least one external fuel reformer reforms the first mixed stream using steam to generate a reformed stream that includes a mixture of $H_2$ and CO. In some embodiments, the first mixed stream contains steam. In some other embodiments, the steam is supplied to the at least one external fuel reformer via the anode inlet depending on the operation condition, for example, startup of the power generation system. Further, since the first anode tail gas stream that contains steam is split before mixing it up with the hydrocarbon fuel and feeding the mixed stream to the at least one fuel reformer or the internal fuel reformer, steam-to-carbon ratio of the reformed stream may be controlled to desired values. The ability to control the steam-to-carbon ratio improves the quality (e.g., heating value) of the reformed stream as a fuel and thus increases an overall efficiency of the fuel cell. Further, the first anode tail gas stream that contains steam is split before mixing it up with the hydrocarbon fuel stream to form the mixed stream. Thus, the quantity of the mixed stream formed and circulated to the at least one internal reformer to generate the reformed stream within the first fuel cell becomes substantially less and easier to handle. Similarly, the quantity of the mixed stream formed and supplied to the at least one external reformer to generate the reformed stream becomes substantially less and easier to handle. Further, since the splitting mechanism is configured to split the first anode tail gas stream (i.e., byproducts) into a first portion and a second portion of the anode tail gas stream, and the first fuel path is configured to circulate only the first portion of the anode tail gas stream, the first fuel path need not handle the entire quantity of the first anode tail gas stream from the first fuel cell. Such reduction in mass of the anode tail gas stream that needs to be handled/circulated by the power generation system also help decreasing the overall cost of the power generation system.

FIG. 1 is a schematic illustration of a power generation system 100 in accordance with one example embodiment. The power generation system 100 includes a first fuel cell 102, a second fuel cell 104, a splitting mechanism 106, a first fuel path 108, and a second fuel path 110. In certain embodiments, the power generation system 100 further includes a first fluid path 114, a first anode outlet channel 116, a first cathode outlet channel 118, a second fluid path 120, a second anode outlet channel 122, a second cathode outlet channel 124, a hydrocarbon fuel source 126, and a hydrocarbon fuel inlet channel 128.

The splitting mechanism 106 is disposed downstream relative to the first fuel cell 102 and is coupled to the first fuel cell 102 via the first anode outlet channel 116. The splitting mechanism 106 is further coupled to an anode inlet 130 of the first fuel cell 102 via the first fuel path 108 and to an anode inlet 132 of the second fuel cell 104 via the second fuel path 110. The hydrocarbon fuel inlet channel 128 is coupled to the first fuel path 108 downstream of the splitting mechanism 106.

In one embodiment, the first fuel cell 102 includes an anode 134, a cathode 136, and an electrolyte 138 disposed there between the anode 134 and the cathode 136. Those skilled in the art understand the general structure and function of fuel cells. In certain embodiments, the first fuel cell 102 is a solid oxide fuel cell (SOFC). In the illustrated embodiment, during startup operation, the first fuel cell 102 receives a hydrocarbon fuel stream 10 via the first fuel path 108. Specifically, the hydrocarbon fuel stream 10 is directed into the anode inlet 130 from the hydrocarbon fuel source 126 via the hydrocarbon fuel inlet channel 128 and the first fuel path 108. In some other embodiments during startup operation, the hydrocarbon fuel stream 10 may be supplied directly to the anode inlet 130 via a hydrocarbon fuel supply channel (not shown). The first fuel cell 102 further receives a first oxidant stream 12 via the first fluid path 114. Specifically, the first oxidant stream 12 is directed from an oxidant source (not shown) to a cathode inlet 140 of the first fuel cell 102 via the first fluid path 114. The hydrocarbon fuel stream 10 may include any suitable fuel, non-limiting examples of which include methane, ethane, propane, methanol, syngas, natural gas, or combinations thereof. In certain embodiments, the hydrocarbon fuel stream 10 includes methane as the fuel. As discussed in detail later, for example, during continuous operation of the power generation system 100, the hydrocarbon fuel stream 10 is combined with a first portion of a first anode tail gas stream to form a first mixed stream, and the first mixed stream is then directed into the anode inlet 130 of the first fuel cell 102. The first oxidant stream 12 may include oxygen or air. In an example embodiment, the first oxidant stream 12 includes air. The electrolyte 138 may be a solid oxide electrolyte or a ceramic electrolyte.

In one embodiment, the first fuel cell 102 converts the hydrocarbon fuel in the hydrocarbon fuel stream 10 into a mixture of hydrogen ($H_2$) and carbon monoxide (CO). An electrochemical reaction of oxygen ions with the $H_2$ occurs at the anode 134, to generate water (often in the form of steam) and electrons. The electrons are transported from the anode 134 to the cathode 136 via an external electrical circuit (not shown). Further, the first oxidant stream 12 absorbs the electrons at the cathode 136, to generate the oxygen ions that are transported through the electrolyte 138 from the cathode 136 to the anode 134 to complete the cell cycle. In certain embodiments, the electrons transported through the external electrical circuit generates electricity or a first electric power 101 or a first electric power quantity or a first electric power load. In certain embodiments, an electrochemical reaction of the oxygen ions with the CO may also occur at the anode 134, resulting in formation of carbon dioxide ($CO_2$). In such embodiments, the anode 134 may include hydrocarbon fuel stream 10 and one or more of the $H_2$, CO, steam, and carbon dioxide. These components may exit the anode 134 through any suitable pathway, and constitute at least a portion of the anode exhaust, referred herein as a "first anode tail gas stream" 14. For example, in one embodiment, the first anode tail gas stream 14 may include $H_2$, CO, water, steam, $CO_2$ and unreformed hydrocarbon fuel (e.g., methane). In some embodiments, the first anode tail gas stream 14 may be comprised of at least 10% by volume of $H_2$ and CO. In some other embodiments, the first anode tail gas stream 14 includes at least 20% of $H_2$ and CO. In yet another embodiment, the first anode tail gas stream 14 includes up to 40% of $H_2$ and CO. The unabsorbed first oxidant stream constitutes at least a portion of the cathode exhaust, often referred to as a "first cathode tail gas stream" 16.

The splitting mechanism 106 receives the first anode tail gas stream 14 via the first anode outlet channel 116. The splitting mechanism 106 splits the first anode tail gas stream 14 into a first portion of the first anode tail gas stream 18 and a second portion of the first anode tail gas stream 20. It should be noted that there is no restriction on the type of splitting mechanism used, and the illustration is meant to cover any type of standard splitting mechanism, e.g., a valve or a piping mechanism. In one embodiment, a ratio of the first portion of the first anode tail gas stream 18 to the second portion of the first anode tail gas stream 20 is in a range from about 6 to about 1.7 (i.e., about 85 volume percent to about 15 volume percent). Specifically, in certain embodiments, the ratio of the first portion of the first anode tail gas stream 18 to the second portion of the first anode tail gas stream 20 is in a range from about 2 to about 0.5 (i.e., about 67 volume percent to about 33 volume percent). In some embodiments, each of the first and second portions of the anode tail gas streams 18, 20 may have substantially the same composition of $H_2$, CO, water, steam, unreformed methane, and the $CO_2$.

The first fuel path 108 receives the first portion of the first anode tail gas stream 18 from the splitting mechanism 106 and the hydrocarbon fuel stream 10 downstream of the splitting mechanism 106 via the hydrocarbon fuel inlet channel 128. The hydrocarbon fuel stream 10 then get mixed with the first portion of the first anode tail gas stream 18 in the first fuel path 108 to form a first mixed stream 22. The first fuel path 108 is configured to circulate the first mixed stream 22 to the anode inlet 130 of the first fuel cell 102. Further, the electrochemical reaction of the first mixed stream 22 (i.e., the reaction between $H_2$ and $O_2$) occurs in the anode 134, thereby resulting in generation of the first anode tail gas stream 14, the first cathode tail gas stream 16, and the first electric power 101, at least in part, by using the first mixed stream 22 as a fuel.

In certain embodiments, splitting the first anode tail gas stream 14, generating the first mixed stream 22, and circulating the mixed stream 22 to the first fuel cell 102 enables to efficiently handle the quantity of first mixed stream 22 that is supplied to the first fuel cell 102 and the quantity of the first anode tail gas stream 14 that is getting circulated within the power generation system. Further, circulating the mixed stream 22 also enhances the efficiency of the first fuel cell 102. Other advantages provided by the circulation features described herein may include without limitation, an automatic supply of water (steam) to the at least one internal fuel reformer or external fuel reformer for generating a reformed stream, negating the requirement for a separate water supply. In some embodiments, feeding the mixed stream 22 directly to the first fuel cell 102 enables to maintain quality (e.g., heating value) and thermal energy in the mixed stream 22, thereby resulting in a higher overall efficiency of the first fuel cell 102. Further, splitting the first anode tail gas stream 14 provides a sufficient quantity of steam to the first fuel cell 102 for reforming/converting the mixed stream 22 to have a substantially high steam-to-carbon ratio for the electrochemical reactions to occur at the anode 134.

The second fuel cell 104 as shown in FIG. 1 may be substantially similar to the first fuel cell 102. Accordingly, the second fuel cell 104 also includes an anode 144, a cathode 146, and an electrolyte 148 disposed there between the anode 144 and the cathode 146. In some embodiments, both the first fuel cell 102, and the second fuel cell 104 may be an SOFC. The second fuel path 110 receives the second portion of the first anode tail gas stream 20 from the splitting mechanism 106 and feeds the second portion of the first anode tail gas stream 20 to the anode inlet 132 of the second fuel cell 104. In certain embodiments, the anode 144 may optionally receive the hydrocarbon fuel stream 10 from the hydrocarbon fuel source 126. The second fuel cell 104 further receives a second oxidant stream 26 from an oxidant source (not shown) and feeds the second oxidant stream 26 to a cathode inlet 150 of the second fuel cell 104. During operation, as discussed herein with regard the first fuel cell 102, the second fuel cell 104 generates a second anode tail gas stream 28, a second cathode tail gas stream 30, and electricity or a second electric power 103 or a second electric power quantity or a second electric power load. Specifically, the second fuel cell 104 generates the second electric power 103, at least in part, by using the second portion of the first anode tail gas stream 20 as a fuel. In some embodiments, feeding the second portion of the first anode tail gas stream 20 directly to the second fuel cell 104 enables to maintain quality (e.g., heating value) and thermal energy in the second portion of the first anode tail gas stream 20, thereby resulting in a higher overall efficiency of the second fuel cell 104. The circulation of the first and second portions of the first anode tail gas streams 18, 20 to the first and second fuel cells 102, 104 respectively in the cascaded fuel cell systems, to generate the first and second electric powers 101, 103 may increase an overall efficiency of the power generation system 100.

For the embodiment of FIG. 1, as well as other embodiments, at least two fuel cells and thereby at least two sources of electrical generation are present. The first fuel cell 102 itself is the first electrical production device, delivering the first electric power 101 to a desired location, for example, an external electrical circuit. The second electrical production device is the second fuel cell 104 that generates the second electric power 103 to a desired location. The ability for the power generation system 100 to provide two sources of the electrical power, with a "boost" originating by way of splitting the first anode tail gas stream 14 and circulating the first portion of the first anode tail gas stream 18 to the first fuel cell 102 and the second portion of the first anode tail gas stream 20, may be a distinct advantage in various industrial operations.

Further, by combining two or more fuel cells, electrical efficiency greater than 65% may be easily achieved. Furthermore, since the first and second fuel cells 102, 104 utilize an electrochemical reaction process for generating electric power, $NO_x$ emissions may be substantially eliminated, which may not possible in conventional combined cycle systems relying on internal/external combustion processes. Some embodiments of the present disclosure further advantageously provide for use of the heat generated in either or both of the first and second fuel cells 102, 104 to heat one or more other streams (e.g. the first or the second oxidant stream), thereby providing greater efficiency and lower energy costs of the overall power generation system.

Figure 2:
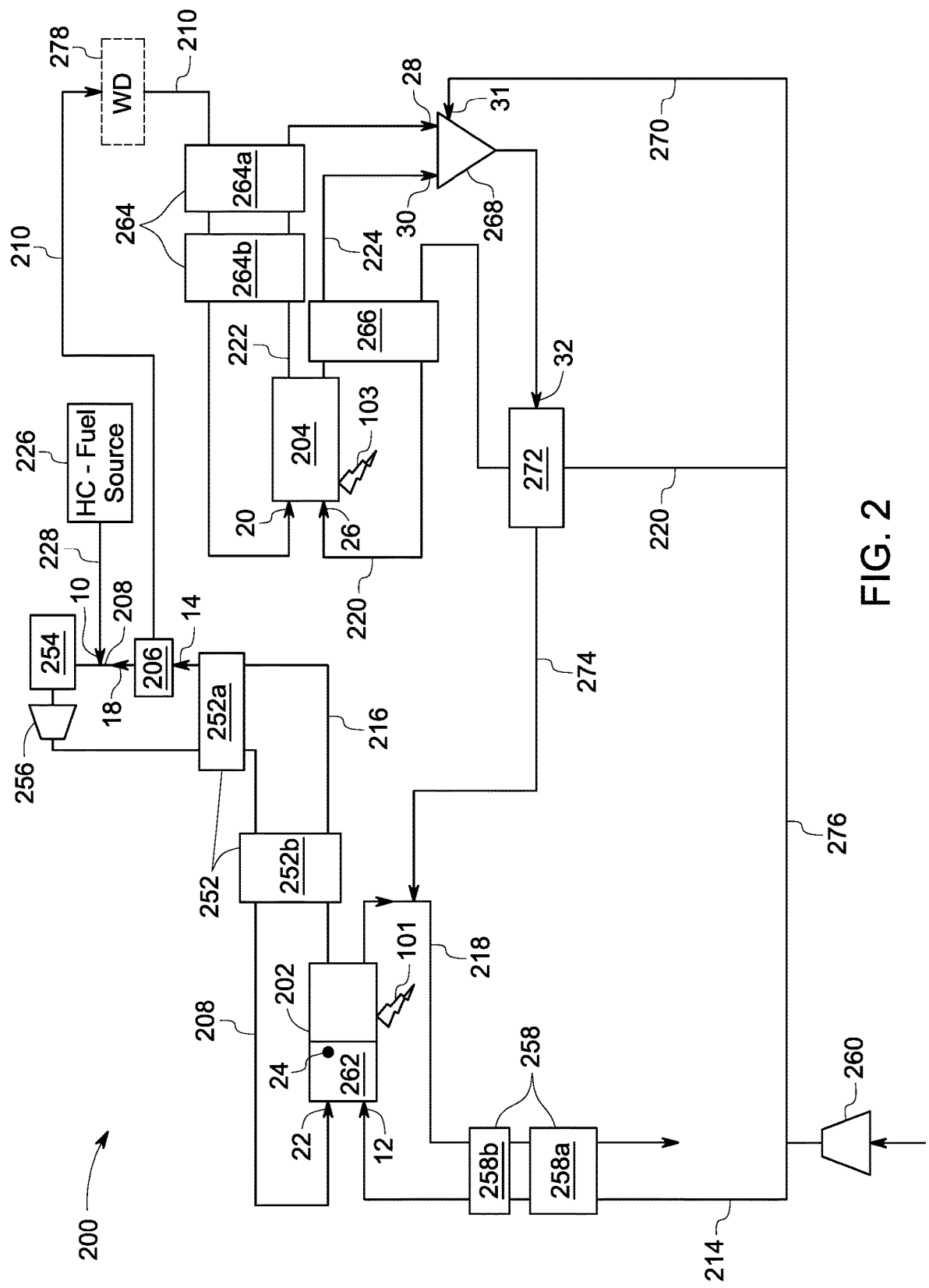
FIG. 2 is a schematic illustration of a power generation system including a reformer disposed within a fuel cell in accordance with one example embodiment of the present disclosure.

FIG. 2 is a schematic illustration of a power generation system 200 in accordance with one example embodiment of the present disclosure. The power generation system 200 includes a first fuel cell 202, a second fuel cell 204, a splitting mechanism 206, a first fuel path 208, and a second fuel path 210. The power generation system 200 further includes a first fluid path 214, a first anode outlet channel 216, a first cathode outlet channel 218, a second fluid path 220, a second anode outlet channel 222, a second cathode outlet channel 224, a hydrocarbon fuel source 226, and a hydrocarbon fuel inlet channel 228.

The first fuel cell 202 is coupled to the splitting mechanism 206 via the first anode outlet channel 216. The splitting mechanism 206 is disposed downstream relative to the first fuel cell 202. Further, the splitting mechanism 206 is coupled to the first fuel cell 202 via the first fuel path 208 (to provide a fuel to the first fuel cell 202) and to the second fuel cell 204 via the second fuel path 210 (to provide a fuel to the second fuel cell 204). The hydrocarbon fuel inlet channel 228 is coupled to the first fuel path 208 downstream of the splitting mechanism 206.

In certain embodiments, the power generation system 200 further includes a first recuperator 252 coupled to the first anode outlet channel 216 and the first fuel path 208. In the illustrated embodiment, the first recuperator 252 includes a low temperature recuperator 252a and a high temperature recuperator 252b. The low temperature recuperator 252a is disposed upstream of the high temperature recuperator 252b relative to a flow of a first mixed stream 22. Further, the power generation system 200 includes a fuel cooler 254 and a first blower 256 coupled to the first fuel path 208. Specifically, the first blower 256 is disposed downstream relative to the fuel cooler 254. Further, the fuel cooler 254 and the first blower 256 are disposed downstream relative to the hydrocarbon fuel inlet channel 228 and upstream relative to the first recuperator 252. In certain embodiments, the power generation system 200 further includes a second recuperator 258 coupled to the first cathode outlet channel 218 and the first fluid path 214. In the illustrated embodiment, the second recuperator 258 includes a low temperature recuperator 258a and a high temperature recuperator 258b. The low temperature recuperator 258a is disposed upstream of the high temperature recuperator 258b relative to a flow of a first oxidant stream 12. Further, the power generation system 200 includes a second blower 260 coupled to the first fluid path 214 via a manifold 276. Similar to the embodiment of the FIG. 1, the power generation system 200 further includes an internal fuel reformer 262 disposed within the first fuel cell 202. Specifically, the internal fuel reformer 262 is disposed in an anode (not shown) of the first fuel cell 202.

The power generation system 200 may further include a third recuperator 264 coupled to the second anode outlet channel 222 and the second fuel path 210 carrying the second portion of the first anode tail gas stream 20. In the illustrated embodiment, the third recuperator 264 includes a low temperature recuperator 264a and a high temperature recuperator 264b. The low temperature recuperator 264a is disposed upstream of the high temperature recuperator 258b relative to a flow of a second portion of a first anode tail gas stream 20. The power generation system 200 may further include a fourth recuperator 266 coupled to the second cathode outlet channel 224 and the second fluid path 220.

In certain embodiments, the power generation system 200 includes a catalytic oxidizer 268 disposed downstream of the second fuel cell 204. The catalytic oxidizer 268 is coupled to the second anode outlet channel 222, the second cathode outlet channel 224, and a third fluid path 270. The power generation system 200 further includes a fifth recuperator 272 coupled to an oxidizer outlet channel 274 of the catalytic oxidizer 268 and the second fluid path 220. In such embodiments, the oxidizer outlet channel 274 may further be coupled to the first cathode outlet channel 218 upstream of the second recuperator 258. In one embodiment, the second blower 260 is coupled to the first, second, and third fluid paths 214, 220, 270 via the manifold 276. The power generation system 200 may further include an optional water separation unit 278 disposed downstream of the splitting mechanism 206 and coupled to the second fuel path 210.

In one or more embodiments, the first, second, third, fourth, and fifth recuperators 252, 258, 264, 266, 272 may be a shell and tube heat exchanger known in the art. Similarly, the first and second blowers 256, 260 may be a compressor. The splitting mechanism 206 may be a valve or a piping mechanism. In some embodiments, the first and second fuel cells 202, 204 are SOFCs. The water separation unit 278 may be a gravity based separator or a weir separator. In certain embodiments, the first fuel cell 202 and the second fuel cell 204 may be coupled to another hydrocarbon fuel source (not shown) via a first hydrocarbon fuel supply channel and a second hydrocarbon fuel supply channel (not shown) respectively. In such embodiments, the other hydrocarbon fuel source may be configured to feed a hydrocarbon fuel stream 10 to the first and second fuel cells 202, 204 during certain operation conditions, for example, startup of the power generation system 200.

During operation, the first fuel cell 202 receives a first mixed stream 22 from the splitting mechanism 206 via the first fuel path 208. The first mixed stream 22 includes a mixture of the hydrocarbon fuel stream 10 and a first portion of the first anode tail gas stream 18. The first fuel cell 202 further receives a first oxidant stream 12 from the second blower 260 via the first fluid path 214 and the manifold 276. The first oxidant stream 12 may be an air stream. The internal fuel reformer 262 is configured to generate a reformed stream 24 using the mixed stream 22. The reformed stream 24 include $H_2$ and CO along with other components as described in the embodiment of FIG. 1. As discussed in the embodiment of FIG. 1, the first fuel cell 202 is configured to generate the first anode tail gas stream 14, a first cathode tail gas stream 16, and a first electric power 101, at least in part, by using the first oxidant stream 12 and the reformed stream 24 generated from the first mixed stream 22 as a fuel.

The splitting mechanism 206 receives the first anode tail gas stream 14 via the first anode outlet channel 216. The splitting mechanism 206 then splits the first anode tail gas stream 14 into the first portion of the first anode tail gas stream 18 and a second portion of the first anode tail gas stream 20. The first fuel path 208 receives the first portion of the first anode tail gas stream 18 from the splitting mechanism 206 and the hydrocarbon fuel stream 10 downstream of the splitting mechanism 206 from the hydrocarbon fuel source 226 via the hydrocarbon fuel inlet channel 228. The hydrocarbon fuel stream 10 then get mixed with the first portion of the first anode tail gas stream 18 in the first fuel path 208 to form the first mixed stream 22 and circulate the first mixed stream 22 to the first fuel cell 202. The first fuel cell 202 generates a first electric power 101 at least in part by using the first mixed stream 22. As discussed herein, the first fuel cell 202 thus generates the first anode tail gas stream 14, the first cathode tail gas stream 16, and the first electric power 101.

In the example embodiment shown in FIG. 2, the fuel cooler 254 receives the first mixed stream 22 and cools the first mixed stream 22. The first blower 256 receives the first mixed stream 22 and increases the pressure of the first mixed stream 22 before feeding the first mixed stream 22 to the first recuperator 252. In one embodiment, the first recuperator 252 extracts heat from the first anode tail gas stream 14 and transfer the extracted heat to the first mixed stream 22. Specifically, the low temperature recuperator 252a extracts a substantially less quantity of heat from the first anode tail gas stream 14 in comparison with the high temperature recuperator 252b and transfers the extracted heat to the first mixed stream 22. The second recuperator 258 extracts heat from the first cathode tail gas stream 16 and transfer the extracted heat to the first oxidant stream 12. Specifically, the low temperature recuperator 258a extracts a substantially less quantity of heat from the first cathode tail gas stream 16 in comparison with the high temperature recuperator 258b and transfers the extracted heat to the first oxidant stream 12. In general, with respect to one or more embodiments, the low temperature recuperator is configured to extract less quantity of heat because of position of the low temperature recuperator in the flow path and/or a specific characteristic, for example, materials used in the low temperature recuperator.

In the embodiment illustrated in FIG. 2, the second fuel path 210 receives the second portion of the first anode tail gas stream 20 from the splitting mechanism 206 and feeds the second portion of the first anode tail gas stream 20 to the water separation unit 278. In such embodiments, the water separation unit 278 separates at least a portion of water from the second portion of the first anode tail gas stream 20 before feeding the second portion of the first anode tail gas stream 20 further to the second fuel cell 204 via the second fuel path 210. The second fuel cell 204 further receives a second oxidant stream 26 from the second blower 260 via the second fluid path 220 and the manifold 276. The second oxidant stream 26 may include a stream of air. As discussed in the embodiment of FIG. 1, the second fuel cell 204 generates the second anode tail gas stream 28, the second cathode tail gas stream 30, and the second electric power 103, at least in part, by using the second oxidant stream 26 and the second portion of the first anode tail gas stream 20, as a fuel.

The third recuperator 264 of FIG. 2 extracts heat from the second anode tail gas stream 28 and transfer the extracted heat to the second portion of the first anode tail gas stream 20. Specifically, the low temperature recuperator 264a extracts a substantially less quantity of heat from the second anode tail gas stream 28 in comparison with the high temperature recuperator 264b and transfers the extracted heat to the second portion of the first anode tail gas stream 20. The fourth recuperator 266 extracts heat from the second cathode tail gas stream 30 and transfer the extracted heat to the second oxidant stream 26. The catalytic oxidizer 268 receives the second anode tail gas stream 28, the second cathode tail gas stream 30, and a third oxidant stream 31 via the third fluid path 270 and oxidizes the second anode tail gas stream 28 and the second cathode tail gas stream 30 to generate an oxidized stream 32. Further, the catalytic oxidizer 268 feeds the oxidized stream 32 via the oxidizer outlet channel 274 to the first cathode outlet channel 218. The fifth recuperator 272 extracts heat from the oxidized stream 32 and transfer the extracted heat to the second oxidant stream 26 before directing the oxidized stream 32 to the first cathode outlet channel 218. In certain embodiments, the second recuperator 258 is configured to further extract heat from the first cathode tail gas stream 16 and the oxidized stream 32 and transfer the extracted heat to the first oxidant stream 12 before discharging the first cathode tail gas stream 16 and the oxidized stream 32 to environment. In certain embodiments, the first recuperator 252 may be further configured to receive the first cathode tail gas stream 16 and the second cathode tail gas stream 30, extract heat from the first cathode tail gas stream 16 and the second cathode tail gas stream 30, and transfer extracted heat to the first mixed stream 22 before discharging the first cathode tail gas stream 16 and the second cathode tail gas stream 30 to environment.

Figure 3:
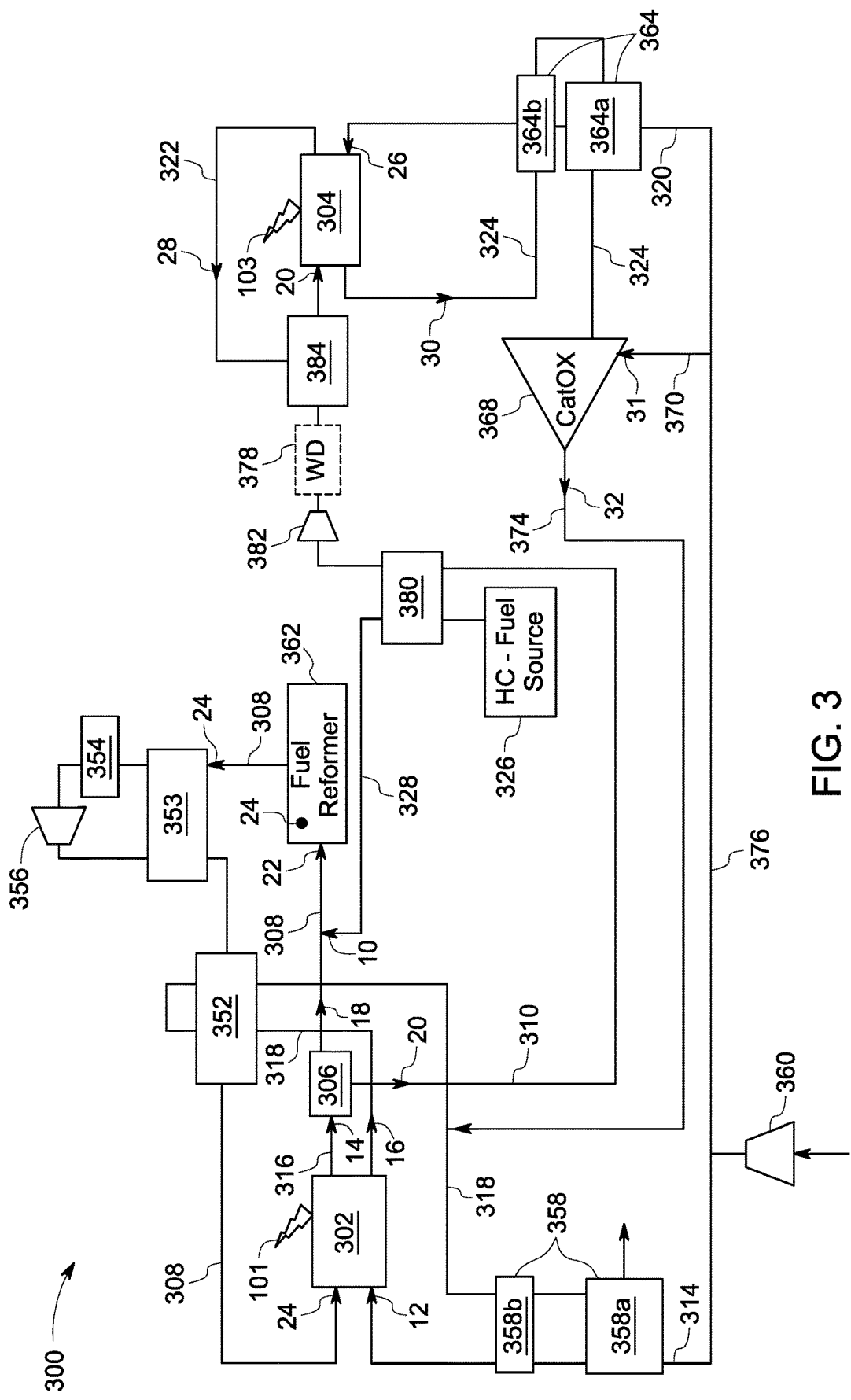
FIG. 3 is a schematic illustration of a power generation system including at least one external reformer disposed downstream a splitting mechanism in accordance with another example embodiment of the present disclosure.

FIG. 3 is a schematic illustration of a power generation system 300 in accordance with another example embodiment of the present disclosure. The power generation system 300 of FIG. 3 includes a first fuel cell 302, a second fuel cell 304, a splitting mechanism 306, a first fuel path 308, and a second fuel path 310. The power generation system 300 further includes a first fluid path 314, a first anode outlet channel 316, a first cathode outlet channel 318, a second fluid path 320, a second anode outlet channel 322, a second cathode outlet channel 324, a hydrocarbon fuel source 326, a hydrocarbon fuel inlet channel 328, and at least one external fuel reformer 362.

The first fuel cell 302 is coupled to the splitting mechanism 306 via the first anode outlet channel 316. The splitting mechanism 306 is disposed downstream relative to the first fuel cell 302. Further, the splitting mechanism 306 is coupled to the first fuel cell 302 via the first fuel path 308 and to the second fuel cell 304 via the second fuel path 310. The hydrocarbon fuel inlet channel 328 is coupled to the first fuel path 308 downstream of the splitting mechanism 306 and upstream of the at least one fuel reformer 362. The at least one fuel reformer 362 is disposed downstream of the splitting mechanism 306 and the hydrocarbon fuel inlet channel 328.

In certain embodiments, the power generation system 300 further includes a first recuperator 352 coupled to the first cathode outlet channel 318 and the first fuel path 308. The power generation system 300 further includes a heat exchanger, a fuel cooler 354, and a first blower 356 coupled to the first fuel path 308. Specifically, the first blower 356 is disposed downstream relative to the fuel cooler 354. The heat exchanger 353 is coupled to a loop of the first fuel path 308. Specifically, the loop corresponds to a first section of the first fuel path 308 extending from the at least one fuel reformer 362 and the fuel cooler 354 and a section of the first fuel path 308 extending from the first blower 356 to the first recuperator 352. In the illustrated embodiment, the heat exchanger 353, the fuel cooler 354, and the first blower 356 are disposed downstream relative to the at least one fuel reformer 362 and upstream relative to the first recuperator 352 in a direction of a flow of a first mixed stream. In certain embodiments, the power generation system 300 further includes a second recuperator 358 coupled to the first cathode outlet channel 318 and the first fluid path 314. In the illustrated embodiment, the second recuperator 358 includes a low temperature recuperator 358a and a high temperature recuperator 358b. The low temperature recuperator 358a is disposed upstream of the high temperature recuperator 358b relative to a flow of a first oxidant stream 12. Further, the power generation system 300 includes a second blower 360 coupled to the first fluid path 314 via a manifold 376.

The power generation system 300 further includes a third recuperator 364 coupled to the second cathode outlet channel 324 and the second fluid path 320. In the illustrated embodiment, the third recuperator 364 includes a low temperature recuperator 364a and a high temperature recuperator 364b. The low temperature recuperator 364a is disposed upstream of the high temperature recuperator 358b relative to a flow of a second oxidant stream 26. The power generation system 300 further includes a first fuel-preheater 380, a third blower 382, an optional water separation unit 378, and a second fuel-preheater 384. The first fuel-preheater 380 is coupled to the second fuel path 310 and the hydrocarbon fuel inlet channel 328. The third blower 382 is disposed downstream relative to the first fuel-preheater 380 and coupled to the second fuel path 310. The water separation unit 378 is disposed downstream of the splitting mechanism 306 and coupled to the second fuel path 310. Specifically, the water separation unit 378 is disposed downstream of the third blower 382. The second fuel-preheater 384 is disposed downstream relative to the water separation unit 378 and coupled to second anode outlet channel 322 and the second fuel path 310.

In certain embodiments, the power generation system 300 includes a catalytic oxidizer 368 disposed downstream of the second fuel cell 304. The catalytic oxidizer 368 is coupled to the second anode outlet channel 322, the second cathode outlet channel 324, and a third fluid path 370. The power generation system 300 further includes an oxidizer outlet channel 374 coupled to the catalytic oxidizer 368 and the first cathode outlet channel 318. In one embodiment, the second blower 360 is coupled to the first, second, and third fluid paths 314, 320, 370 via the manifold 376.

In one or more embodiments, the first, second, and third recuperators 352, 358, 364 may be a shell and tube heat exchanger known in the art. Similarly, the first and second fuel-preheaters 380, 384 may be a shell and tube heat exchanger known in the art. The first and second blowers 356, 360 may be a compressor. The splitting mechanism 306 may be a valve or a piping mechanism. In some embodiments, both the first fuel cell 302 and the second fuel cell 304 are SOFCs. The water separation unit 378 may be a gravity based separator or a weir separator. In certain embodiments, the first fuel cell 302 and the second fuel cell 304 may be coupled to another hydrocarbon fuel source (not shown) via a first hydrocarbon fuel supply channel and a second hydrocarbon fuel supply channel (not shown) respectively. In such embodiments, the other hydrocarbon fuel source may be configured to feed a hydrocarbon fuel stream 10 to the first and second fuel cells 302, 304 during certain operation conditions, for example, startup of the power generation system 300.

During operation, the first fuel cell 302 receives a reformed stream 24 from the at least one fuel reformer 362 via the first fuel path 308. The at least one fuel reformer 362 is configured to generate the reformed stream 24 using the mixed stream 22. In such embodiments, the reformed stream 24 generally includes a mixture of $H_2$ and CO. The first fuel cell 302 further receives a first oxidant stream 12 from the second blower 360 via the first fluid path 314 and the manifold 376. The first oxidant stream 12 may include air as the oxidant. The first fuel cell 302 is configured to generate the first anode tail gas stream 14, a first cathode tail gas stream 16, and a first electric power 101, at least in part, by using the first oxidant stream 12 and the reformed stream 24 as a fuel.

The splitting mechanism 306 receives the first anode tail gas stream 14 via the first anode outlet channel 316. The splitting mechanism 306 splits the first anode tail gas stream 14 into the first portion of the first anode tail gas stream 18 and a second portion of the first anode tail gas stream 20. The first fuel path 308 receives the first portion of the first anode tail gas stream 18 from the splitting mechanism 306 and the hydrocarbon fuel stream 10 downstream of the splitting mechanism 306 from the hydrocarbon fuel source 326 via the hydrocarbon fuel inlet channel 328. The hydrocarbon fuel stream 10 then get mixed with the first portion of the first anode tail gas stream 18 in the first fuel path 308 to form the first mixed stream 22 and feeds the first mixed stream 22 to the at least one fuel reformer 362. The at least one fuel reformer 362 is configured to generate the reformed stream 24 using the first mixed stream 22. In such embodiments, the reformed stream 24 generally include $H_2$ and CO. The first fuel path 308 further circulates the reformed stream 24 to the first fuel cell 302. The first fuel cell 302 further generates the first anode tail gas stream 14, the first cathode tail gas stream 16, and the first electric power 101 at least in part by using the reformed stream 24 as fuel.

As illustrated in FIG. 3, the fuel cooler 354 receives the reformed stream 24 from the at least one fuel reformer 362 via the heat exchanger 353, which is configured to extract heat from the reformed stream 24. Further, the fuel cooler 354 cools the reformed stream 24 and feeds the reformed stream 24 to the first blower 356, which is configured to increases the pressure of the reformed stream 24. In such embodiments, the heat exchanger 353 is further configured to transfer the extracted heat to the reformed stream received from the first blower 356. The reformed stream 24 is then fed from the heat exchanger 353 to the first recuperator 352. In one embodiment, the first recuperator 352 extracts heat from the first cathode tail gas stream 16 and transfer the extracted heat to the reformed stream 24. The second recuperator 358 extracts heat from the first cathode tail gas stream 16 and transfer the extracted heat to the first oxidant stream 12. Specifically, the low temperature recuperator 358a extracts a substantially less quantity of heat from the first cathode tail gas stream 16 in comparison with the high temperature recuperator 358b and transfers the extracted heat to the first oxidant stream 12.

The second fuel path 310 receives the second portion of the first anode tail gas stream 20 from the splitting mechanism 306 and feeds the second portion of the first anode tail gas stream 20 to the first fuel-preheater 380. In such embodiments, the first fuel-preheater 380 extracts heat from the second portion of the first anode tail gas stream 20 and transfer the extracted heat to the hydrocarbon fuel stream 10. The first fuel-preheater 380 further feeds the second portion of first anode tail gas stream 20 to the third blower 382. In such embodiments, the third blower 382 increases the pressure of the second portion of the first anode tail gas stream 20 and feeds the second portion of the first anode tail gas stream 20 to the water separation unit 378. In such embodiments, the water separation unit 378 separates at least a portion of water from the second portion of the first anode tail gas stream 20 before feeding the second portion of the first anode tail gas stream 20 to the second fuel-preheater 384. In such embodiments, the second fuel-preheater 384 extracts heat from a second anode tail gas stream 28 and transfer the extracted heat to the second portion of the first anode tail gas stream 20. The second fuel-preheater 384 further feeds the second portion of the first anode tail gas stream 20 to the second fuel cell 304 via the second fuel path 310. The second fuel cell 304 further receives a second oxidant stream 26 from the second blower 360 via the second fluid path 320 and the manifold 376. The second oxidant stream 26 includes air. Similar to the embodiment of FIG. 1, the second fuel cell 304 in FIG. 3 generates the second anode tail gas stream 28, the second cathode tail gas stream 30, and the second electric power 103, at least in part, by using the second oxidant stream 26 and the second portion of the first anode tail gas stream 20, as a fuel.

The third recuperator 364 extracts heat from the second cathode tail gas stream 30 and transfer the extracted heat to the second oxidant stream 26. Specifically, the low temperature recuperator 364a extracts a substantially less quantity of heat from the second cathode tail gas stream 30 in comparison with the high temperature recuperator 364b and transfers the extracted heat to the second oxidant stream 26. The catalytic oxidizer 368 receives the second anode tail gas stream 28, the second cathode tail gas stream 30, and a third oxidant stream 31 via the third fluid path 370 and oxidizes the second anode tail gas stream 28 and the second cathode tail gas stream 30 to generate an oxidized stream 32. Further, the catalytic oxidizer 368 feeds the oxidized stream 32 via the oxidizer outlet channel 374 to the first cathode outlet channel 318. In certain embodiments, the second recuperator 358 is configured to further extract heat from the first cathode tail gas stream 16 and the oxidized stream 32 and transfer the extracted heat to the first oxidant stream 12 before discharging the first cathode tail gas stream 16 and the oxidized stream 32 to environment.

In certain embodiments, splitting the first anode tail gas stream 14 enables to maintain a substantially higher steam-to-carbon ratio, which is in a range from about 2 to about 3. Further, such a process of splitting the first anode tail gas stream 14 enhances quality (i.e., heating value) of the fuel been fed to the first and second fuel cells 302, 304, thereby improving the efficiency an overall efficiency of the power generation system 300.

Figure 4:
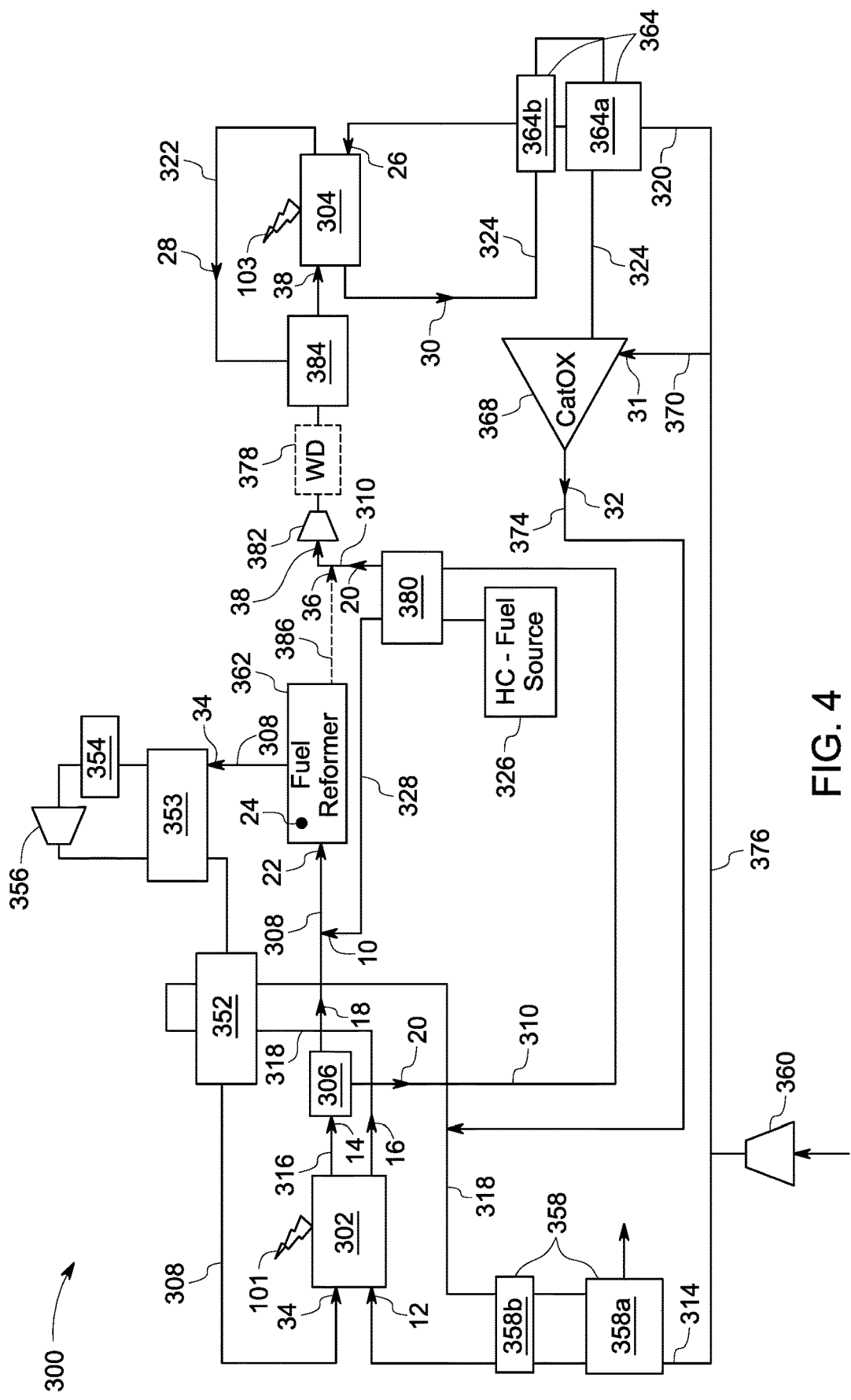
FIG. 4 is a schematic illustration of a power generation system including a slip-stream channel from the at least one external reformer to a fuel path extending from the fuel cell in accordance with the example embodiment of the FIG. 2.

FIG. 4 is a schematic illustration of the power generation system including a slip-stream channel 386 in accordance with the example embodiment of the FIG. 2. The first fuel path 308 receives a first portion of the reformed stream 34 from the at least one fuel reformer 362 and circulates the first portion of the reformed stream 34 to the first fuel cell 302. The first fuel cell 302 generates the first anode tail gas stream 14, the first cathode tail gas stream 16, and the first electric power 101 at least in part by using the first portion of the reformed stream 34 as fuel. In the illustrated embodiment, the slip-stream channel 386 extends from the at least one fuel reformer 362 to the second fuel path 310. Specifically, the slip-stream channel 386 is coupled to the second fuel path 310 upstream of the first fuel-preheater 380 and downstream of the third blower 382. In such embodiments, the second fuel path 310 receives a second portion of the reformed stream 36 from the at least one fuel reformer 362 via the slip-stream channel 386, mixes the second portion of the reformed stream 36 with the second portion of the first anode tail gas stream 20 to form a second mixed stream 38, and circulate the second mixed stream 38 to the second fuel cell 304. In such embodiments, the third blower 382 receives the second mixed stream 38 from the second fuel path 310 and increases the pressure of the second mixed stream 38 and feeds the second mixed stream 38 to the water separation unit 378. The water separation unit 378 separates at least a portion of water from the second mixed stream 38 before feeding the second mixed stream 38 to the second fuel-preheater 384. The second fuel-preheater 384 extracts heat from the second anode tail gas stream 28 and transfer the extracted heat to the second mixed stream 38. The second fuel-preheater 384 further feeds the second mixed stream 38 to the second fuel cell 304 via the second fuel path 310. The second fuel cell 304 further receives the second oxidant stream 26 from the second blower 360 via the second fluid path 320 and the manifold 376. The second fuel cell 304 generates the second anode tail gas stream 28, the second cathode tail gas stream 30, and the second electric power 103, at least in part, by using the second oxidant stream 26 and the second mixed stream 38, as a fuel. In certain embodiments, mixing the second portion of the reformed stream 36 to the second portion of the first anode tail gas stream 20 enhances quality of the fuel (i.e., the second mixed stream 38) been fed to the second fuel cell 304, thereby improving the efficiency an overall efficiency of the power generation system 300.

Figure 5:
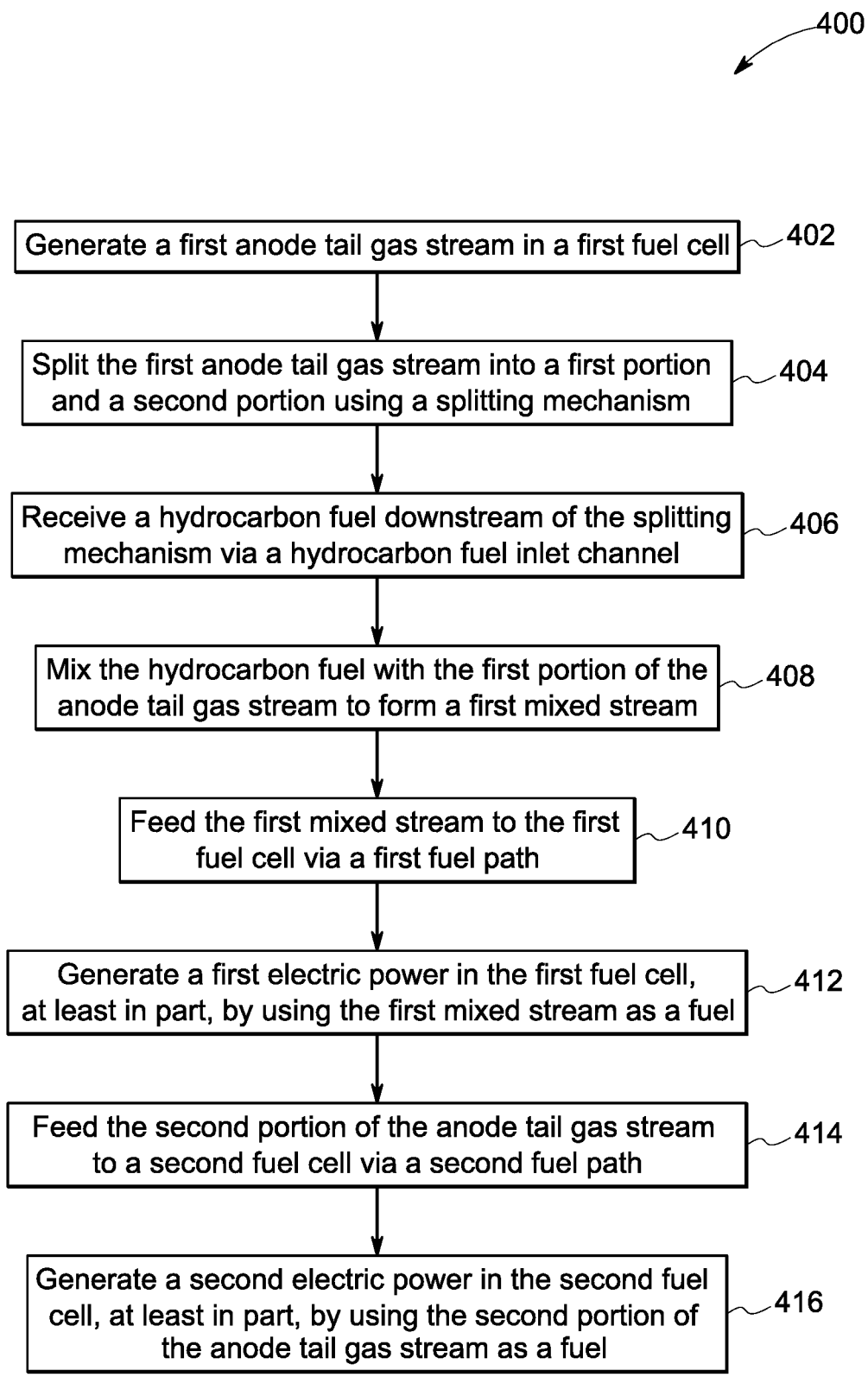
FIG. 5 is a flow diagram of a method for generating electric power using a power generation system having cascaded fuel cells in accordance with one example embodiment.

FIG. 5 is a flow diagram of one example embodiment of a method 400 for generating electric power using a power generation system having cascaded fuel cells as described. The method 400 involves generating an anode tail gas stream in a first fuel cell in step 402. In certain embodiments, the first fuel cell is configured to receive the first oxidant stream and a first mixed stream or a reformed stream to generate the anode tail gas stream. The method 400 further involves splitting the anode tail gas stream into a first portion and a second portion using a splitting mechanism in step 404. Further, the method 400 involves receiving a hydrocarbon fuel downstream of the splitting mechanism via a hydrocarbon fuel inlet channel in step 406 and mixing the hydrocarbon fuel with the first portion of the anode tail gas stream to form a first mixed stream in step 408. In one or more embodiments, the steps 406, 408 are performed in a first fuel path. The method 400 further involves feeding the first mixed stream to the first fuel cell via the first fuel path in step 410 and generating a first electric power in the first fuel cell, at least in part, by using the first mixed stream or the reformed stream as a fuel in step 412. In certain embodiments, the first fuel cell is a solid oxide fuel cell (SOFC). Further, the method 400 involves feeding the second portion of the anode tail gas stream to a second fuel cell via a second fuel path in step 414 and generating a second electric power in the second fuel cell, at least in part, by using the second portion of the anode tail gas stream as a fuel in step 416. In some embodiment, the second fuel cell is also an SOFC.

In one embodiment, the steps 410, 412 involves sub steps of i) supplying the first mixed stream to at least one internal fuel reformer disposed within the first fuel cell, ii) generating a reformed stream using the at least one internal fuel reformer, and ii) generating the first electric power in the first fuel cell by using the reformed stream.

In another embodiment, the steps 410, 412 involves sub steps of i) supplying the first mixed stream to at least one fuel reformer located downstream of the splitting mechanism and coupled to the first fuel path, ii) generating a reformed stream using the at least one fuel reformer, iii) supplying the reformed stream from the at least one fuel reformer to the first fuel cell, and iv) generating the first electric power in the first fuel cell by using the reformed stream.

In yet another embodiment, the steps 410, 412, 414, 416 involves sub steps of i) supplying the first mixed stream to at least one fuel reformer located downstream of the splitting mechanism and coupled to the first fuel path, ii) generating a reformed stream using the at least one fuel reformer, iii) supplying a portion of the reformed stream from the at least one fuel reformer to the first fuel cell, iv) generating the first electric power in the first fuel cell by using the first portion of the reformed stream, v) supplying a second portion of the reformed stream from the at least one fuel reformer to the second fuel path via a slip-stream channel extending from the at least one fuel reformer to the second fuel path, vi) mixing the second portion of the reformed stream with the second portion of the anode tail gas stream to form a second mixed stream in the second fuel path, vii) supplying the second mixed stream to the second fuel cell, and viii) generating the second electric power in the second fuel cell by using the second mixed stream.

In accordance with one or more embodiments discussed herein, an exemplary power generation system is configured to enhance efficiency of the fuel cells. In certain embodiments, splitting a first anode tail gas stream enables to efficiently handle quantity of a mixed stream been supplied to the first fuel cell for power generation. Further, circulating the mixed stream also enhances the efficiency of the first and second fuel cells. Further, feeding the mixed stream to the first and second fuel cells enable to maintain quality (e.g., heating value) and thermal energy, thereby resulting improving an overall efficiency of the power generation system. Further, splitting the first anode tail gas stream enables to maintain a substantially high steam-to-carbon ratio for electrochemical reactions to occur at the anode of respective fuel cells. Similarly, mixing the slip-stream with a second portion of the first anode tail gas stream provides a substantially higher steam-to-carbon ratio and enhances quality of the fuel been fed to the second fuel cell.

The power generation system as discussed in the embodiments of FIGS. 1-4 may include multiple cascaded fuel cells to improve the overall efficiency. In other words, even though the embodiments of FIGS. 1-4 teach using two fuel cells for generating the electric power, there may be more than two fuel cells to make the power generation system even more efficient. The current disclosure should not be construed to be limited to have only two fuel cells.

The disclosed invention may be embodied in other specific forms without departing from the spirit or essential characteristics thereof. The foregoing embodiments are selected embodiments or examples from a manifold of all possible embodiments or examples. The foregoing embodiments are therefore to be considered in all respects as illustrative rather than limiting on the invention described herein. While only certain features of the invention have been illustrated, and described herein, it is to be understood that one skilled in the art, given the benefit of this disclosure, will be able to identify, select, optimize or modify suitable conditions/parameters for using the methods in accordance with the principles of the present invention, suitable for these and other types of applications. The precise use of the power generation system by, choice of location of the splitting mechanism, choice of having at least one internal or external fuel reformer, choice of having a slip stream coupled to the at least one external fuel reformer, and the like may depend in large part on the particular application for which it is intended. It is, therefore, to be understood that the appended claims are intended to cover all such modifications and changes that fall within the true spirit of the present invention. Further, all changes that come within the meaning and range of equivalency of the claims are intended to be embraced therein.

The invention claimed is:

1. A power generation system, comprising:
 a first fuel cell including a first anode inlet, a first anode outlet channel, and a first cathode outlet channel, the first fuel cell configured to generate a first anode tail gas stream and a first cathode tail gas stream and discharge the first cathode tail gas stream using the first cathode outlet channel;
 a second fuel cell including a second anode inlet, the second fuel cell configured to generate a second anode tail gas stream and a second cathode tail gas stream;
 a splitting mechanism in direct communication with the first anode outlet channel, the splitting mechanism configured to split the first anode tail gas stream into a first portion and a second portion;
 a first fuel path in communication with an outlet of the splitting mechanism, the first fuel path configured to receive the first portion of the first anode tail gas stream via the outlet of the splitting mechanism and a hydrocarbon fuel stream downstream of the splitting mechanism via a hydrocarbon fuel inlet channel, mix the hydrocarbon fuel stream with the first portion of the first anode tail gas stream to form a first mixed stream, and circulate the first mixed stream to the first anode inlet of the first fuel cell, wherein the first fuel cell is further configured to generate a first electric power, at least in part, by using the first mixed stream as a fuel;
 a second fuel path configured to feed the second portion of the first anode tail gas stream directly to the second fuel cell via the second anode inlet, wherein the second fuel cell is further configured to generate a second electric power, at least in part, by using the second portion of the first anode tail gas stream as a fuel; and
 a catalytic oxidizer disposed downstream of the second fuel cell, wherein the catalytic oxidizer is configured to (i) receive the second anode tail gas stream and the second cathode tail gas stream, and a catalytic oxidizer oxidant stream, (ii) oxidize the second anode tail gas stream and the second cathode tail gas stream to generate an oxidized stream, and (iii) feed the oxidized stream via an oxidizer outlet channel to the first cathode outlet channel.

2. The power generation system of claim 1, further comprising a second cathode outlet channel for discharging the second cathode tail gas stream, a first fluid path configured to feed a first oxidant stream to the first fuel cell, and a second fluid path configured to feed a second oxidant stream to the second fuel cell.

3. The power generation system of claim 2, wherein the first fuel cell comprises at least one internal fuel reformer configured to receive the first mixed stream and generate a reformed stream such that the first electric power is generated by using the reformed stream.

4. The power generation system of claim 3, further comprising a first recuperator coupled to the first anode outlet channel and the first fuel path, wherein the first recuperator is configured to extract heat from the first anode tail gas stream and transfer the extracted heat to the first mixed stream.

5. The power generation system of claim 4, further comprising a second recuperator coupled to the first cathode outlet channel and the first fluid path, wherein the second recuperator is configured to extract heat from the first cathode tail gas stream and transfer the extracted heat to the first oxidant stream.

6. The power generation system of claim 5, further comprising a third recuperator coupled to the second anode outlet channel and the second fuel path, wherein the third recuperator is configured to extract heat from the second anode tail gas stream and transfer the extracted heat to the second portion of the first anode tail gas stream.

7. The power generation system of claim 6, further comprising a fourth recuperator coupled to the second cathode outlet channel and the second fluid path, wherein the fourth recuperator is configured to extract heat from the second cathode tail gas stream and transfer the extracted heat to the second oxidant stream.

8. The power generation system of claim 1, further comprising a fifth recuperator coupled to the oxidizer outlet channel and the second fluid path, wherein the fifth recuperator is configured to extract heat from the oxidized stream and transfer the extracted heat to the second oxidant stream.

9. The power generation system of claim 2, further comprising a water separation unit disposed downstream of the splitting mechanism and coupled to the second fuel path, wherein the water separation unit is configured to separate at least a portion of water from the second portion of the first anode tail gas stream before feeding to the second fuel cell.

10. The power generation system of claim 2, further comprising at least one fuel reformer located downstream of the splitting mechanism and coupled to the first fuel path, wherein the at least one fuel reformer is configured to receive the first mixed stream, generate a reformed stream, and circulate a first portion of the reformed stream to the first fuel cell such that the first electric power is generated by using the first portion of the reformed stream.

11. The power generation system of claim 10, further comprising a slip-stream channel extending from the at least one fuel reformer to the second fuel path, wherein the second fuel path is configured to receive a second portion of the reformed stream via the slip-stream channel, mix with the second portion of the first anode tail gas stream to form a second mixed stream, and circulate the second mixed stream to the second fuel cell such that the second electric power is generated by using the second mixed stream.

12. The power generation system of claim 11, further comprising a first recuperator coupled to the first cathode outlet channel and the first fuel path, wherein the first recuperator is configured to extract heat from the first cathode tail gas stream and transfer the extracted heat to the first portion of the reformed stream.

13. The power generation system of claim 12, further comprising a second recuperator coupled to the first cathode outlet channel and the first fluid path, wherein the second recuperator is configured to extract heat from the first cathode tail gas stream and transfer the extracted heat to the first oxidant stream.

14. The power generation system of claim 13, further comprising a third recuperator coupled to the second cathode outlet channel and the second fluid path, wherein the third recuperator is configured to extract heat from the second cathode tail gas stream and transfer the extracted heat to the second oxidant stream.

15. The power generation system of claim 11, further comprising a first fuel-preheater coupled to the second fuel path and the hydrocarbon fuel inlet channel, wherein the first fuel-preheater is configured to extract heat from the second portion of the first anode tail gas stream and transfer the extracted heat to the hydrocarbon fuel stream.

16. The power generation system of claim 15, further comprising a water separation unit disposed downstream of the splitting mechanism and coupled to the second fuel path, wherein the water separation unit is configured to separate at least a portion of water from the second portion of the first anode tail gas stream or the second mixed stream before feeding to the second fuel cell.

17. The power generation system of claim 16, further comprising a second fuel-preheater coupled to second anode outlet channel and the second fuel path downstream of the water separation unit, wherein the second fuel-preheater is configured to extract heat from the second anode tail gas stream and transfer the extracted heat to the second portion of the first anode tail gas stream or the second mixed stream.

18. A method of generating electric power using the power generation system of claim 1 comprising:
generating an anode tail gas stream in a first fuel cell;
splitting the anode tail gas stream into a first portion and a second portion using a splitting mechanism in direct communication with a first anode outlet channel of the first fuel cell;
receiving, in a first fuel path in communication with an outlet of the splitting mechanism, the first portion of the first anode tail gas stream via the outlet of the splitting mechanism and a hydrocarbon fuel stream downstream of the splitting mechanism via a hydrocarbon fuel inlet channel;
mixing the hydrocarbon fuel stream with the first portion of the anode tail gas stream to form a first mixed stream;
feeding the first mixed stream to the first fuel cell via the first fuel path;
generating a first electric power in the first fuel cell, at least in part, by using the first mixed stream as a fuel;
feeding the second portion of the anode tail gas stream directly to a second fuel cell via a second fuel path; and
generating a second electric power in the second fuel cell, at least in part, by using the second portion of the anode tail gas stream as a fuel.

19. The method of claim 18, wherein feeding the first mixed stream to the first fuel cell and generating the first electric power in the first fuel cell comprises:
supplying the first mixed stream to at least one internal fuel reformer disposed within the first fuel cell;
generating a reformed stream using the at least one internal fuel reformer; and
generating the first electric power in the first fuel cell by using the reformed stream.

20. The method of claim 18, wherein feeding the first mixed stream to the first fuel cell and generating the first electric power in the first fuel cell comprises:
supplying the first mixed stream to at least one fuel reformer located downstream of the splitting mechanism and coupled to the first fuel path;
generating a reformed stream using the at least one fuel reformer;

supplying the reformed stream from the at least one fuel reformer to the first fuel cell; and generating the first electric power in the first fuel cell by using the first portion of the reformed stream.

21. The method of claim 18, wherein feeding the first mixed stream to the first fuel cell, generating the first electric power in the first fuel cell, feeding the second portion of the anode tail gas stream to the second fuel cell, and generating the second electric power in the second fuel cell comprises:

supplying the first mixed stream to at least one fuel reformer located downstream of the splitting mechanism and coupled to the first fuel path;

generating a reformed stream using the at least one fuel reformer;

supplying a first portion of the reformed stream from the at least one fuel reformer to the first fuel cell;

generating the first electric power in the first fuel cell by using the first portion of the reformed stream;

supplying a second portion of the reformed stream from the at least one fuel reformer to the second fuel path via a slip-stream channel extending from the at least one fuel reformer to the second fuel path;

mixing the second portion of the reformed stream with the second portion of the anode tail gas stream to form a second mixed stream in the second fuel path;

supplying the second mixed stream to the second fuel cell; and generating the second electric power in the second fuel cell by using the second mixed stream.

* * * * *